Aug. 6, 1957     D. C. CORNE     2,802,044
JOINT FOR WIRES

Filed Aug. 20, 1951     2 Sheets-Sheet 1

INVENTOR.
Dustin C. Corne
BY
his ATTORNEY

Aug. 6, 1957

D. C. CORNE 2,802,044

JOINT FOR WIRES

Filed Aug. 20, 1951

INVENTOR.
Dustin C. Corne
BY
Warren H. F. Schmieding
his ATTORNEY

United States Patent Office 2,802,044
Patented Aug. 6, 1957

2,802,044

JOINT FOR WIRES

Dustin C. Corne, Laurelville, Ohio

Application August 20, 1951, Serial No. 242,751

1 Claim. (Cl. 174—84)

The present invention relates generally to an improved joint for wires, and more particularly to a method utilizing a cartridge into which wire ends are inserted, with the cartridge adapted internally to simultaneously solder and frictionally fasten the wire ends when external force is applied to the cartridge.

It is an object of the present invention to provide a method and apparatus for soldering and frictionally fastening wire ends by a simple mechanical motion.

It is another object of this invention to provide a method and apparatus for making a completed wire joint which will have electrical and mechanical properties equivalent to those of the original wire.

It is another object of this invention to provide a method and apparatus for the splicing of military field wires, whereby a lineman can rapidly and silently complete a splicing operation under adverse weather and blackout conditions without disclosing the location of the user by either light or sound.

Further objects and advantages of the present invention will be apparent from the following description, reference being had to the accompanying drawings wherein preferred forms of embodiments of the invention are clearly shown.

Figure 1:
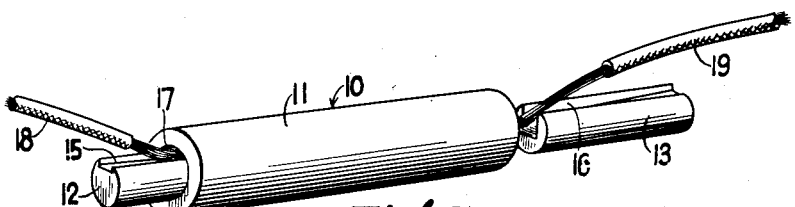
Fig. 1 is a perspective view of a wire joint constructed in accordance with the present invention.

Referring now more particularly to the drawings, it will be seen that one embodiment of the present invention disclosed in Fig. 1, consists of a cartridge indicated generally at 10. This cartridge is provided with a cartridge case 11 in the form of an open ended tube. Two identical wedging elements 12 and 13 are formed to fit the inside of the cartridge case 11 and are partially inserted into each end thereof so that the wedged grooves 15 and 16, and the inside wall of the cartridge case 11 form holes, one of which is shown at 17, into which the wires 18 and 19 may be freely inserted. In Fig. 1, wire 18 is shown in a position prior to insertion into the cartridge. Wire 19 is shown already inserted.

Figure 2:
Fig. 2 is a vertical sectional view showing the internal elements of the wire joint disclosed in Fig. 1.

Fig. 2 shows the interior of a cartridge case 11 carrying the wedging elements 12 and 13 in a partially inserted position. Wires 18 and 19 are both shown completely inserted in tapered grooves 15 and 16, so that the uninsulated wire ends 20 and 21 engage the walls of container 22 adjacent to the inside faces 23 and 24 of the wedging elements 12 and 13 respectively. The rupturable container 22, carried in the cartridge 10, may be filled with a liquid soldering substance 25 or the like.

Figure 3:
Fig. 3 is another vertical sectional view of the same embodiment shown in Fig. 2, but with the internal elements shown in a different configuration.

Fig. 3 shows the interior of a cartridge case 11 with the wedging elements 12 and 13 in a compressed position so that the wires 18 and 19 are frictionally fastened in the cartridge case 11 by being wedged between the inside surface of the cartridge case 11 and the wedging elements 12 and 13. With the configuration of elements shown in Fig. 3, the rupturable container 22 of Fig. 2 has been ruptured by the inward compression of wedging elements 12 and 13. The liquid soldering substance 25 was thereby liberated from the container so as to flow around the various elements carried within the cartridge case. This may be clearly seen at 25 of Fig. 3. To allow the wires 18 and 19 to ride inwardly with wedging elements 12 and 13, the open ends of cartridge case 11 are provided with radii 26 and 27 thereby eliminating any sharp edges that might catch wires 18 and 19 and damage their insulation.

Figure 4:
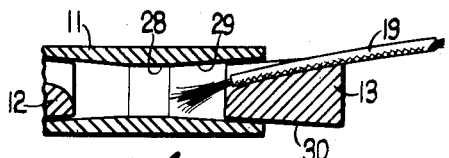
Fig. 4 is a second adaption of the same invention.

Reference is now particularly made to different shapes for the wedging elements 12 and 13 and the cooperating interior surface 28 of cartridge case 11 that are adapted to applicant's apparatus without departing from the spirit of his invention. Fig. 4 shows the interior surface 28 tapered outwardly larger at 29 to receive wedging element 13, the surface 30 of which is outwardly tapered larger.

Figure 5:
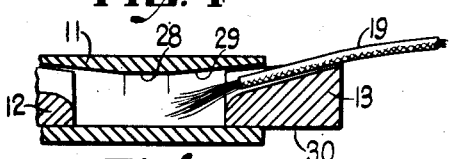
Fig. 5 is a third adaption of the same invention.

Fig. 5 shows the interior surface 28 tapered outwardly larger at 29 as in Fig. 4, but the wedging element 13 is rod-shaped with its outer surface 30 untapered.

Figure 6:
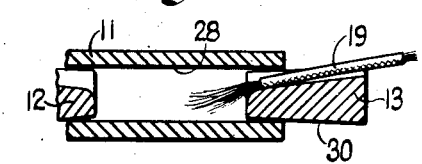
Fig. 6 is a fourth adaption of the same invention.

In Fig. 6, the cartridge case 11 is in the form of a tube with its inner surface untapered, but the outer surface 30 of wedging element 13 is tapered outwardly larger.

Figure 7:
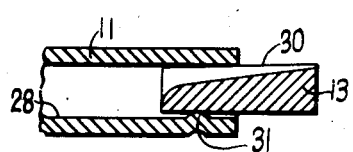
Fig. 7 is a fifth adaption of the same invention.

In Fig. 7, the inner surface 28 of cartridge case 11 is shown with an inwardly projecting element 31 formed to engage the surface 30 of wedging element 13, thereby holding the wedging element in place when partially inserted. The projecting element 31, or a plurality of such, may be formed by punching the cartridge case 11, when cartridges are being assembled so that wedging elements 12 and 13 can be retained partially inserted, providing for the insertion of wires 18 and 19 at a later time when a wire joint is to be made.

Figure 8:
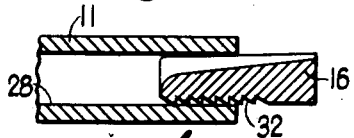
Fig. 8 is a sixth adaption of the same invention.

Fig. 8, shows cartridge case 11 in the form of a tube as previously described, but wedging element 13 is provided with gripping teeth 32 adapted to bite into internal wall 28 of cartridge case 11. The teeth 32 serve the dual purpose of retaining the wedging element 13 in a partially inserted position, and of opposing the withdrawal of wedging element 13 after it has been inwardly compressed.

Figure 9:
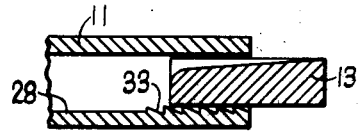
Fig. 9 is a seventh adaption of the same invention.

In Fig. 9 the gripping teeth 33 are formed on the inner surface 28 of the cartridge case 11 to serve the same dual purpose referred to in the description of Fig. 8.

Figure 10:
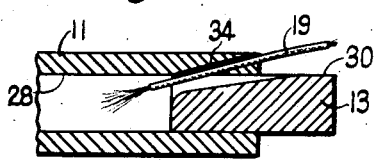
Fig. 10 is an eighth adaption of the same invention.

Fig. 10 shows a groove 34 tapered progressively deeper outwardly in inner surface 28 of cartridge case 11. Groove 34 is so formed to receive wire 19 and to frictionally fasten it in the cartridge by wedging it against surface 30 of wedging element 13 when the element is inwardly compressed.

Figure 11:
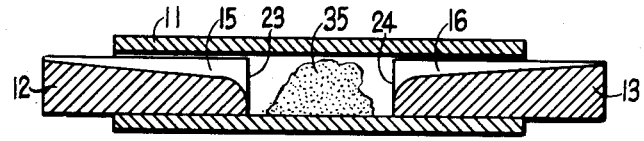
Fig. 11 is a ninth adaption of the same invention.

Fig. 11 shows an embodiment of the present invention wherein a solid soldering substance 35 is carried directly by the cartridge case 11 without the use of a rupturable container such as is used with the embodiment of Fig. 2. Such solid soldering substance can be caused to flow by application of heat to the cartridge case 11 during formation of the wire joint.

Another example is the use of a soldering substance 35 in the form of a paste so as to be caused to surround and contact the internal elements by the application of pressure to it when the wedging elements 12 and 13 are inwardly compressed. When the soldering substance 35 is in such latter described form, the structural strength of a joint will be entirely dependent on adequately fastening the wires 18 and 19 and the wedging elements 12 and 13 to the cartridge case 11 by friction or wedging as previously described.

Figure 12:
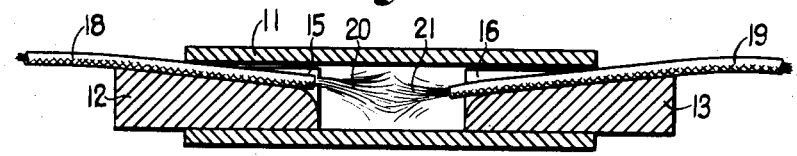
Fig. 12 is a tenth adaption of the same invention.

Fig. 12 shows an embodiment of the present invention having no soldering substance provided. In such an embodiment electrical contact is maintained, as the wire ends 20 and 21 of wires 18 and 19 respectively are inserted to mutually contact each other, and to contact the cartridge case elements which themselves can be conductors of electricity.

Figure 13:
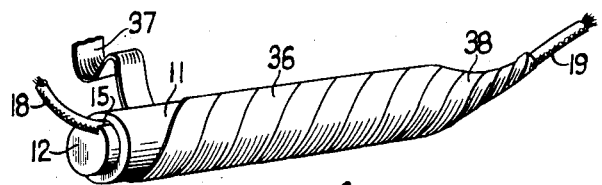
Fig. 13 is a perspective view of a wire joint showing an eleventh adaption of the same invention.

Fig. 13 shows a main insulating element 36 which may be tape or some other form of 36 which may cover the cartridge case 11. The insulating elements 37 and 38 are provided for the insulation of the ends of cartridge case 11 after the wires 18 and 19 are joined thereto. These latter insulating elements are carried by the cartridge case 11 as shown at 37 so as to be conveniently present for insulating the end of the cartridge case 11, as shown at 38, after the wedging elements 12 and 13 have been compressed. As shown in Fig. 13, the insulating elements 37 and 38 may be unwrapped ends of the tape comprising main insulating element 36.

Figure 14:
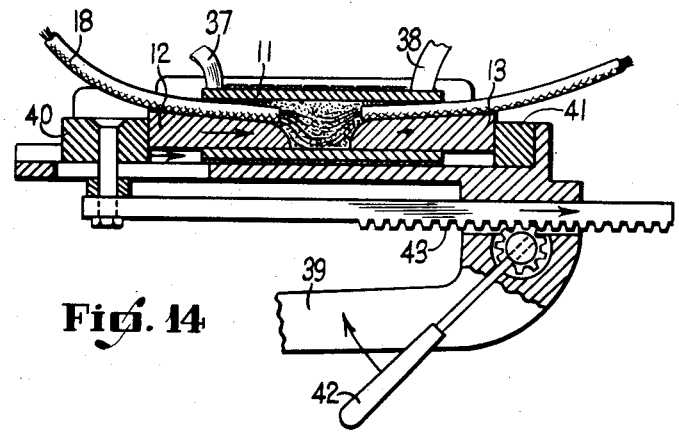
Fig. 14 is a sectional view of a wire joint constructed in accordance with the present invention, showing a pressing apparatus used in conjunction therewith.

The operation is as follows:

Referring to Fig. 14, an assembled cartridge as shown generally at 10 and a portable pressing apparatus, an example of which is shown generally at 39 are transported to the place along a wire line where a break in the wire has occurred. Wires 18 and 19, comprising the broken line to be joined, are then inserted into the openings in the ends of the cartridge 10 and pushed inwardly as far as possible. To complete the wire joint, cartridge 10 with wires 18 and 19 inserted, is placed in the portable pressing apparatus 39 between the jaws 40 and 41, as shown in Fig. 14. Pressing apparatus 39 is adapted so that actuation of handle 42 operates the rack and pinion 43, which imparts relative motion to jaws 40 and 41 thereby compressing wedging elements 12 and 13 into cartridge case 11. The inward compression of the wedging elements ruptures container 22 of Fig. 1, liberating liquid soldering substance 25. Such inward compression of the wedging elements also wedges the wires 18 and 19 in the cartridge case 10. Hence it is seen that wires 18 and 19 are simultaneously soldered and frictionally fastened by the application of an external pressing force by simple mechanical motion. Cartridge 10, with wires 18 and 19 attached, is then removed from pressing apparatus 39 and insulating elements 37 and 38 are affixed to the ends of cartridge case 10 to complete the wire joint.

While the forms of embodiments of the present invention as herein disclosed constitute preferred forms, it is to be understood that other forms might be adopted, all coming within the scope of the claim which follows.

I claim:

An improved joint for wires comprising a cartridge case having a plurality of openings therein, a plurality of wires extending into the cartridge case through said openings, a soldering substance carried within the cartridge case and engageable with the wires and case for soldering same one to the other, a plurality of solid sleeves each of which is separately carried in a respective opening in the cartridge case, each of said sleeves having an axially extending, inwardly inclined, wire receiving groove in the surface thereof, each groove confronting and being complementary with a wire engaging portion of each opening of said cartridge case, each sleeve and groove being compressed inwardly when inserted within the opening of said cartridge case such that each wire carried in each groove will be retained in a wedged state between each inclined groove and each corresponding complementary wire engaging portion of each opening of said cartridge case.

References Cited in the file of this patent

UNITED STATES PATENTS

| | | |
|---|---|---|
| 355,611 | Howson | Jan. 4, 1887 |
| 459,513 | Montz | Sept. 15, 1891 |
| 934,711 | Chapman | Sept. 21, 1909 |
| 1,393,107 | Fuller | Oct. 11, 1921 |
| 1,552,244 | Thomas | Sept. 1, 1925 |
| 1,706,898 | Peel | Mar. 26, 1929 |
| 1,769,101 | Becker | July 1, 1930 |
| 1,801,277 | Kelley | Apr. 21, 1931 |
| 2,288,918 | Parker | July 7, 1942 |
| 2,289,512 | McKenney et al. | July 14, 1942 |
| 2,421,047 | Wolfson et al. | May 27, 1947 |
| 2,494,137 | Martines | Jan. 10, 1950 |

FOREIGN PATENTS

| | | |
|---|---|---|
| 534,609 | France | Mar. 29, 1922 |
| 682,783 | Germany | Oct. 21, 1939 |